United States Patent [19]

Smith et al.

[11] Patent Number: 5,780,537
[45] Date of Patent: Jul. 14, 1998

[54] SILICA-FILLED RUBBER COMPOSITION CONTAINING TWO DIFFERENT CARBON BLACKS AND TIRE WITH TREAD MADE THEREFROM

[75] Inventors: Richard Robinson Smith, Cuyahoga Falls; Kevin James Pyle, Uniontown; William Paul Francik, Bath; Paul Harry Sandstrom, Tallmadge, all of Ohio

[73] Assignee: The Goodyear Tire & Rubber Company, Akron, Ohio

[21] Appl. No.: 915,838

[22] Filed: Aug. 21, 1997

Related U.S. Application Data

[63] Continuation of Ser. No. 667,691, Jun. 21, 1996.

[51] Int. Cl.$^6$ .............................. C08K 3/00; C08K 3/04; C08L 7/00
[52] U.S. Cl. ...................... 524/493; 524/493; 524/494; 524/495; 524/496; 524/565; 524/573; 524/574; 524/575; 524/575.5; 152/209 R
[58] Field of Search ........................... 524/493, 494, 524/495, 496, 565, 573, 574, 575, 575.5; 152/209 R

[56] References Cited

U.S. PATENT DOCUMENTS

| | | | |
|---|---|---|---|
| 3,873,489 | 3/1975 | Thurn et al. | 260/33.6 |
| 4,690,965 | 9/1987 | Hirata et al. | 524/236 |
| 4,786,677 | 11/1988 | Nakai et al. | 524/496 |
| 5,066,721 | 11/1991 | Hamada et al. | 525/102 |
| 5,132,357 | 7/1992 | Endter et al. | 524/496 |
| 5,336,730 | 8/1994 | Sandstrom et al. | 524/493 |
| 5,341,863 | 8/1994 | Sandstrom et al. | 152/209 R |
| 5,430,087 | 7/1995 | Carlson et al. | 524/496 |
| 5,447,971 | 9/1995 | Bergh et al. | 524/496 |
| 5,494,955 | 2/1996 | Swor et al. | 524/496 |
| 5,534,578 | 7/1996 | Wideman et al. | 524/493 |
| 5,696,197 | 12/1997 | Smith et al. | 524/495 |

OTHER PUBLICATIONS

Lee, B L. "Controlled Ingredient-Distribution Mixing: Effect on Some Properties of Elastomer Blend Compounds," American Chemical Society (1984), 12, p.186.

Sircar, A K, et al, "Carbon Black Transfer in Blends of Cis-Poly(Butadiene) with Other Elastomers," RC&T (1973), 46, pp. 178-190.

Lee, B L, Experimental Studies of the Relationship of Processing to the Crack Growth of Carbon-Black-Loaded SBR—cis-Polybutadiene Compounds, Journal of Applied Polymer Science, vol. 27, pp. 3379-3392 (1982).

Primary Examiner—Morton Foelak
Attorney, Agent, or Firm—Bruce J. Hendricks

[57] ABSTRACT

The present invention relates to a silica-filled rubber composition reinforced with a combination of silica and a mixture of two defined carbon blacks and to pneumatic tires having treads comprised of such rubber composition.

12 Claims, No Drawings

SILICA-FILLED RUBBER COMPOSITION CONTAINING TWO DIFFERENT CARBON BLACKS AND TIRE WITH TREAD MADE THEREFROM

This application is a continuation of copending application Ser. No. 08/667,691, filed on Jun. 21, 1996.

FIELD

This invention relates to rubber compositions which are reinforced with a combination of silica and two defined carbon blacks, together with a silica coupler for the silica, and to tires with treads made therefrom.

In one aspect, the rubber composition is comprised of at least one diene-based, sulfur-curable elastomer reinforced with (a) precipitated silica, (b) two defined carbon blacks and (c) at least one silica coupling agent.

BACKGROUND

Rubber compositions are typically used for tire treads which may be optimized for various rubber composition properties to promote three tire properties; namely, traction, rolling resistance and treadwear.

Silica is sometimes used as reinforcement for tire tread rubber. A silica coupler is usually used to couple the silica to the elastomer(s) for reinforcement purposes. Sometimes the silica is used in minor amounts (eg. less than 20 phr) in combination with larger amounts of carbon black. Sometimes, the silica may be the primary, or major, reinforcement in the tire tread rubber composition for reduced tire rolling resistance purposes.

However, it is disadvantageous to use silica as a primary reinforcement for the rubber composition of a tire tread, as compared to carbon black reinforcement, primarily because of its (i) substantially increased material cost and (ii) increased mixing requirements.

However, for some tire applications, it remains desirable to use silica as reinforcement for tire treads.

Accordingly, it is desired herein to provide an alternative rubber composition for tire tread applications which would normally use a substantial amount of silica reinforcement, with rubber compositions having improved physical properties yet having reduced filler material costs.

In this regard, typically desirable physical properties for tire tread rubber compositions may include, for example, hardness, modulus, hysteresis as indicated by rebound properties, tangent delta (Tan. delta) at 0° C., and abrasion resistance as indicated by DIN abrasion values. Such physical properties are well known to those having skill in the rubber compounding art and are considered to be predictive of tire tread performance.

SUMMARY OF THE INVENTION

In accordance with this invention, a rubber composition is provided which comprises (A) 100 parts by weight of at least one diene-based elastomer, (B) about 30 to about 120 phr particulate reinforcing filler composed of silica and carbon black wherein said filler is comprised of (i) about 15 to about 60 phr of precipitated silica and (ii) about 15 to about 60 phr particulate carbon black and the weight ratio of total precipitated silica to total carbon black ranges from 1:4 to 4:1, wherein said carbon black further comprises a mixture of two carbon blacks, wherein the first carbon black has a DBP absorption value in a range of about 60 to about 160 cc/100 gm with a corresponding Iodine Adsorption Number in a range of about 25 to about 85 g/kg and the second carbon black has a DBP absorption value in a range of about 90 to about 160 cc/100 gm with a corresponding Iodine Number in a range of about 90 to about 150 g/kg; and (C) a silica coupling agent composition having a moiety characterized by being reactive with the surface of the silica and another moiety characterized by being interactive with diene-based elastomers; namely, elastomers having carbon-to-carbon double bonds and the weight ratio of silica coupling agent to precipitated silica ranging from 1:2 to 1:100.

DETAILED DESCRIPTION

It is considered that this invention is particularly applicable where it is desired that less silica be used in a tire tread elastomer composition, particularly for the aforesaid reasons, but it is desired to substantially retain the rubber composition physical properties attributed to the use of the more quantitative silica reinforcement.

According to this invention, it is believed to be a very substantial departure from past practice, for rubber tire treads, to replace at least a portion of the silica in a silica-reinforced tire tread elastomer composition by using a mixture of a low reinforcing carbon black and a high reinforcing carbon black.

The term "phr," if used herein, and according to conventional practice, refers to "parts of a respective material per 100 parts by weight of rubber or elastomer".

In the description of this invention, the terms "rubber" and "elastomer," if used herein, may be used interchangeably, unless otherwise prescribed. The terms "rubber composition," "compounded rubber" and "rubber compound," if used herein, are used interchangeably to refer to "rubber which has been blended or mixed with various ingredients and materials" and such terms are well known to those having skill in the rubber mixing or rubber compounding art.

It is understood that the DBP (dibutylphthalate) absorption values may be determined by ASTM test D2414 and the Iodine Number may be determined by ASTM test D1510.

Carbon black properties such as Iodine Number and DBP oil absorption values are well known to those having skill in such art.

For example, the Iodine Number for carbon black is a measure of its surface area and is expressed in units of g/kg. A higher Iodine Number is indicative of smaller particle size which, in turn, is indicative of higher surface area for the carbon black and typically a higher reinforcing carbon black for elastomers.

The DBP (dibutylphthalate) absorption value for carbon black is a measure of its structure, or aggregate size and is expressed in cubic centimeters per 100 grams of carbon black. A higher DBP absorption value indicative of larger aggregates which, in turn, is indicative of higher structure for the carbon black. The DBP values are not as definitive for high reinforcing carbon blacks as the Iodine Number.

Iodine Numbers and DBP values together with representative ASTM designated N- numbers may be found, for example, in *The Vanderbilt Rubber Handbook, Thirteenth Edition* (1990), page 417.

An essential part of the present invention is the use of a mixture of two different carbon blacks. The first carbon black is a low reinforcing carbon black and has a DBP absorption value in a range of about 60 to about 160 cc/100 gm with a corresponding Iodine Adsorption Number in a range of about 25 to about 85 g/kg. Preferably, the first carbon black has a DBP absorption value in a range of about 100 to about 140 cc/100 gm with a corresponding Iodine Number in a range of about 45 to about 70 m²/g. Representative carbon blacks that fall within the above ranges include N326, N336, N332, N351, N358, N539, N550, N630, N642, N650, N660, N683, N762, N765, N774 and N787. The preferred carbon black is N351.

The second carbon black used is a high reinforcing carbon black. The second carbon black has a DBP absorption value in a range of about 90 to about 160 cc/100 gm and a corresponding Iodine Number in a range of about 90 to about 150 g/kg. Preferably, the second carbon black has a DBP absorption value in a range of about 100 to about 140 cc/100 gm with a corresponding Iodine Number in a range of about 100 to about 140 m²/g. Representative carbon blacks that fall within the above ranges include N110, N121, N220, N231, N234, N242, N293, N299, N339, N343, N347 and N375.

The weight ratio of the first carbon black (low reinforcing) to the second carbon black (high reinforcing) may vary. Generally speaking, the weight ratio of the first carbon black to the second carbon black will range from about 2:1 to 1:2. Preferably, the weight ratio will range from 1.5:1 to 1:1.5.

It is considered herein that an important aspect of the discovery is that mixtures of specific low reinforcing carbon blacks and specific high reinforcing carbon blacks in combination with silica can be used to reinforce elastomers, yielding rubber compositions having attendant similar rubber composition properties for tire treads which are reinforced with higher levels of silica.

In the practice of this invention, as hereinbefore pointed out, the rubber composition is comprised of at least one diene-based elastomer, or rubber. Such elastomers are typically selected from homopolymers and copolymers of conjugated dienes and copolymers of conjugated diene(s) and vinyl aromatic compound such as, for example, styrene and alphamethylstyrene. Such dienes may, for example, be selected from isoprene and 1,3-butadiene and such vinyl aromatic compounds may be selected from styrene and alphamethylstyrene. Such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70–95 percent trans), low vinyl polybutadiene rubber (10–30 percent vinyl), medium vinyl polybutadiene rubber (30–50 percent vinyl) and high vinyl polybutadiene rubber (50–90 percent vinyl).

In one aspect, the rubber is preferably comprised of at least two diene-based rubbers. For example, a combination of two or more rubbers is preferred such as cis 1,4-polyisoprene rubber (natural or synthetic, although natural is usually preferred), 3,4-polyisoprene rubber, isoprene/butadiene copolymer rubber, styrene/isoprene/butadiene rubber, emulsion and solution polymerization derived styrene/butadiene rubbers, cis 1,4-polybutadiene rubbers, medium vinyl polybutadiene rubbers (30–55 percent vinyl), high vinyl polybutadiene rubbers (55–90 percent vinyl) and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition.

The 3,4-PI and use thereof is more fully described in U.S. Pat. No. 5,087,668. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear.

Such BR can be prepared, for example, by organic solution polymerization of 1,3-butadiene.

The BR may be conveniently characterized, for example, by having at least a 90 percent cis 1,4-content.

The cis 1,4-polyisoprene and cis 1,4-polyisoprene natural rubber are well known to those having skill in the rubber art.

A styrene/isoprene/butadiene terpolymer elastomer (SIBR) may be used in rubber composition of this invention. Representative examples of various SIBRs may be found, for example, in U.S. Pat. Nos. 5,137,998, 5,159,020 and 5,272,220.

The commonly employed siliceous pigments used in rubber compounding applications can be used as the silica for this invention, including pyrogenic and precipitated siliceous pigments (silica), although precipitated silicas are preferred.

The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300, cc/100 gm.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc with, for example, designations of Zeosil 1165MP and silicas available from Degussa AG with, for example, designations VN2 and VN3, etc.

The weight ratio of precipitated silica to total carbon black may range from about 4:1 to 1:4. Preferably, the weight ratio ranges from about 3:1 to 1:3.

In addition to the two different carbon blacks and silica, a silica coupling agent is present to promote the interaction of the silica and rubber. Various known silica couplers may be used.

One example of a silica coupler is a sulfur-containing organosilicon compound. Examples of sulfur-containing organosilicon compounds are of the formula:

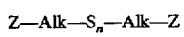

in which Z is selected from the group consisting of

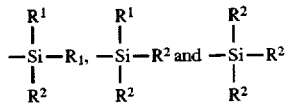

where

R$^1$ is an alkyl group of 1 to 4 carbon atoms, cyclohexyl or phenyl;

R$^2$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxysilylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur-containing organosilicon compounds are the 3,3'-bis(trimethoxy or triethoxy silylpropyl) sulfides. The most preferred compound is 3,3'-bis(triethoxysilylpropyl) tetrasulfide. Therefore, as to the above formula, preferably Z is

where

R$^2$ is an alkoxy of 2 to 4 carbon atoms, with 2 carbon atoms being particularly preferred;

Alk is a divalent hydrocarbon of 2 to 4 carbon atoms with 3 carbon atoms being particularly preferred; and n is an integer of from 3 to 5 with 4 being particularly preferred.

The amount of the silica coupler in a rubber composition will vary depending on the level of silica that is used. Generally speaking, the amount of the coupler will range from 0.5 to 50 phr. Preferably, the amount will range from 1.5 to 8 phr. Depending on the desired properties, the weight ratio of the silica coupler to silica may vary. Generally speaking, the weight ratio will range from 1:2 to 1:100. Preferably, the weight ratio will range from 1:5 to 1:20.

A preferred rubber composition of the present invention comprises (A) 100 parts by weight of at least one diene-based elastomer, (B) about 50 to about 100 phr of particulate reinforcing filler composed of silica and carbon black wherein said filler is comprised of (i) about 25 to about 50 phr of precipitated silica and (ii) about 25 to about 50 phr particulate carbon black wherein said carbon black further comprises a mixture of two carbon blacks, wherein the first carbon black has a DBP absorption value in a range of about 100 to about 140 cc/100 gm with a corresponding Iodine Number in a range of about 45 to about 70 g/kg, and the second carbon black has a DBP absorption value in a range of about 100 to about 140 cc/100 gm with a corresponding Iodine Number in a range of about 100 to about 140 g/kg; and (C) a coupling agent as a trialkoxyorganosilane polysulfide having from 2 to about 8 sulfur atoms in its polysulfide bridge.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur-vulcanizable and sulfur-vulcanized material (rubbers), the additives mentioned above are selected and commonly used in conventional amounts.

The composition of the present invention may contain conventional amounts of known rubber chemicals.

Typical amounts of tackifier resins, if used, may comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which are usually comprised primarily of stearic acid, comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization of the rubber composition is conducted in the presence of a sulfur-vulcanizing agent. Examples of suitable sulfur-vulcanizing agents include elemental sulfur (free sulfur) or sulfur-donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 5 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives, other than aspects of the two carbon blacks, silica and silica coupling agent, are not considered to be an aspect of the present invention which is more primarily directed to the utilization of specified blends of carbon blacks in rubber compositions, in combination with silica and silica coupling agents.

The rubber composition may be and is preferably prepared by thermomechanically working and mixing the diene-based rubber, silica, carbon blacks and silica coupler, exclusive of the rubber curatives, with at least one mechanical mixer, usually referred to as "non-productive" mix stage(s), for a sufficient duration of time to promote the reaction of the included silica coupler between the silica and the diene-based elastomer(s), followed by a final mix stage in which the curatives, such as sulfur and accelerators, are added. The final mix stage is conventionally called the "productive" mix stage in which the mixing typically occurs at a maximum temperature which is lower than the maximum mixing temperature(s) of the preceding non-productive mixing stages. The terms "non-productive" and "productive" mix stages are well known to those having skill in the rubber mixing art.

In the practice of this invention, the following thermomechanical working and mixing procedure is preferred:

The rubber composition of this invention and, therefore, a rubber composition for the rubber tread of the tire of this invention, is preferably prepared by (a) thermomechanically working and mixing a mixture comprised of the said diene-based elastomer, silica, two carbon blacks and silica coupler in at least two sequential mixing stages with at least one mechanical mixer, preferably selected from at least one internal mixer, open mill mixer and/or extruder, to (i) a maximum temperature in a range of about 160° C. to about 200° C. and for a duration of time, upon reaching said maximum temperature, in a range of about 1 to about 8 minutes at a temperature within about 5° C. to about 10° C. of said maximum temperature, or (ii) a maximum temperature in a range of about 155° C. to about 180° C. and for a duration of time, upon reaching said maximum temperature, in a range of about 4 to about 20 minutes at a temperature within about 5° C. to about 10° C. of said maximum temperature, followed by (b) mixing curatives, namely, sulfur and accelerator(s) with said mixture in a final mixing stage for about 1 to about 4 minutes to a temperature of about 90° C. to about 120° C.; whereas the rubber mixture is cooled to a temperature below about 40° C. between each of the aforesaid mix stages.

It is to be appreciated that the rubber composition is conventionally cooled to a temperature below about 40° C. between the aforesaid mix stages.

It is to be further appreciated that the aforesaid duration of time for the required temperature maintenance for the mixing process(es) during the non-productive mix stages can be accomplished, for example, by (i) adjusting the motor speed of the mixer, namely reducing the motor speed after the desired temperature of the rubber composition is reached, in a variable speed mixer or by (ii) utilizing two or more mix stages sufficient to satisfy the duration requirement for the aforesaid maximum mixing temperature maintenance.

Vulcanization of the rubber composition of the present invention is generally carried out at conventional temperatures ranging from 100° C. to 200° C. Preferably, the vulcanization is conducted at temperatures ranging from 110° C. to 180° C. Any of the usual vulcanization processes may be used such as heating in a press or mold, heating with superheated steam or hot air or in a salt bath.

Upon vulcanization of the sulfur-vulcanized composition, the rubber composition of this invention can be used for various purposes. For example, the sulfur-vulcanized rubber composition may be in the form of a pneumatic tire, belt, hose, air spring, shoe product and motor mount. In case of a tire, it can be used for various tire components. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

The invention may be better understood by reference to the following examples in which the parts and percentages are by weight unless otherwise indicated.

EXAMPLE 1

Controls

In this example, a rubber composition is provided that is reinforced with 80 phr silica and referenced herein as Control 1. Also included are two samples which illustrate the difficulty of matching the properties of a highly loaded silica compound with a partial or total replacement of silica with carbon black. In Control 2, the silica is partially replaced with 40 phr of a high reinforcing carbon black, whereas, in Control 3, silica is totally replaced with 83 phr of a low reinforcing carbon black. The ingredients of each rubber composition are shown in the following Table 1.

All of the rubber compositions for this Example were prepared as a blend of emulsion polymerization prepared butadiene/styrene copolymer elastomer (E-SBR), isoprene/butadiene copolymer rubber (IBR), cis 1,4-polybutadiene rubber (BR) and cis 1,4-polyisoprene natural rubber (NR).

The compositions were prepared by mixing the ingredients in several stages; namely, one non-productive stage (without the curatives) followed by a productive mix stage (for the curatives), then the resulting composition was cured under conditions of elevated temperature and pressure.

For the non-productive mixing stage, exclusive of the accelerator(s) and sulfur curatives which are mixed (added) in the final, productive mixing stage, the ingredients, including the elastomers, are mixed for four minutes to a temperature of about 160° C. and the motor speed of the mixer then slowed to maintain a substantially constant temperature of the elastomer composition of about 160° C. for an additional seven minutes. To the resulting rubber composition (mixture) was then mixed the curatives in a Banbury type mixer; namely, the accelerator(s) and sulfur to a maximum temperature of about 120° C. for about three minutes.

The resulting rubber compositions were then vulcanized at a temperature of about 150° C. for about 25 minutes.

TABLE 1

| Sample No. | Ctrl 1 | Ctrl 2 | Ctrl 3 |
|---|---|---|---|
| Non-Productive Mix Stages | | | |
| E-SBR[1] | 25 | 25 | 25 |
| IBR[2] | 45 | 45 | 45 |
| BR[3] | 20 | 20 | 20 |
| Natural Rubber[4] | 10 | 10 | 10 |
| Processing Oil[5] | 26.3 | 26.3 | 26.3 |
| Zinc Oxide | 2.5 | 2.5 | 2.5 |
| Fatty Acid | 3 | 3 | 3 |
| Antioxidant[6] | 3 | 3 | 3 |
| Silica[7] | 80 | 40 | 0 |
| Carbon Black (N220)[8] | 0 | 40 | 0 |
| Carbon Black (N351)[9] | 0 | 0 | 83 |
| Coupling Agent[10] | 12.8 | 6.4 | 6.4 |
| Productive Mix Stage | | | |
| Sulfur | 1.40 | 1.40 | 1.40 |
| Accelerators[11] | 3.5 | 2.6 | 2.6 |
| Retarder[12] | 0.1 | 0.4 | 0.4 |

[1]Emulsion polymerization prepared SBR having a styrene content of about 41 percent of the type obtainable as 1721 from the Huels AG company.
[2]Isoprene/butadiene copolymer rubber having an isoprene content of about 50 percent obtained from The Goodyear Tire & Rubber Company, and a Tg of about −43° C.
[3]Cis 1,4-polybutadiene rubber obtained as Budene® 1254 from The Goodyear Tire & Rubber Company.
[4]Natural rubber (cis 1,4-polyisoprene).
[5]Rubber processing oil as being 9.4 parts in the E-SBR and 5 parts in the PBd, where the amounts of E-SBR and PBd are reported above on a dry weight (without the oil) and in addition, about 11 parts additional rubber processing oil were added.
[6]Of the alkylaryl paraphenylene diamine type.
[7]A silica obtained as Zeosil™ 1165MP from the Rhone-Poulenc company, and reportedly, having a BET surface area of about 165 and a DBP absorption value of about 260–280.
[8]N220 has an Iodine Number of 121 g/kg and a corresponding DBP absorption value of 114 cc/100 gm.
[9]N351 has an Iodine Number of 68 g/kg and a corresponding DBP absorption value of 120 cc/100 gm.
[10]A composition of bis-(3-triethoxysilylpropyl) tetrasulfide and N333 carbon black (50/50 weight ratio and, thus, considered as being 50 percent active) commercially available as X50S from Degussa.
[11]The accelerators were of the sulfenamide and diphenylguanidine type.
[12]The retarder was of the thiophthalmide type.

In Ctrl 2, the amount of silica coupling agent was reduced because of the reduction in amount of silica, with the ratio of coupler to silica remaining the same for Ctrl 1. Also, the level of accelerators were reduced in Ctrls 2 and 3 since the carbon black reinforced compositions do not need as potent a cure system to achieve optimum cured properties.

The physical properties for the resulting vulcanized rubber compositions are shown in the following Table 2.

The DIN abrasion test is sometimes referred to as "DIN 53516" and is indicative of rubber wear due to abrasion. The DIN abrasion test is well known to those skilled in such art. A higher value is indicative of a larger amount of rubber removed by abrasion and, thus, a greater amount of wear for the rubber sample.

All of the other tests including the tensile strength, elongation, 300 percent modulus, hot and cold rebound and hardness methods of rubber characterization are well known to those having skill in such art.

TABLE 2

| Sample No. | Ctrl 1 | Ctrl 2 | Ctrl 3 |
|---|---|---|---|
| Stress-Strain | | | |

TABLE 2-continued

| Sample No. | Ctrl 1 | Ctrl 2 | Ctrl 3 |
|---|---|---|---|
| Tensile Strength, MPa | 16.5 | 17.2 | 15.3 |
| Elongation at Break, % | 500 | 530 | 360 |
| 300% Modulus, MPa | 9.7 | 9.6 | 14.2 |
| Rebound | | | |
| 100° C., (%) | 61 | 54 | 54 |
| 23° C., (%) | 36 | 30 | 33 |
| Hardness (Shore A) | | | |
| 23° C. | 65 | 68 | 68 |
| 100° C. | 60 | 59 | 62 |
| DIN Abrasion | | | |
| Volume Loss (cc) | 80 | 106 | 84 |
| Tan Delta | | | |
| at 0° C. | 0.168 | 0.148 | 0.174 |

Ctrl 2 shows that the rebound values (100° C. and room temperature values) were significantly lower than the values for Ctrl 1. Lower rebound values indicate higher hysteresis for the rubber composition and is predictive of increased rolling resistance for a tire tread and, thus, lower vehicular fuel economy. The DIN abrasion value was also inferior in Ctrl 2 as compared to Ctrl 1. Thus, insofar as providing a tread rubber with enhanced rebound and stiffness properties, the partial substitution of the high reinforcing N220 reinforcing carbon black for the silica is considered herein to have been unsuccessful.

Ctrl 3 indicates that complete replacement of the silica with the low reinforcing N351 type of carbon black did not yield properties equal to the control. In particular, the rebound and the elongation at break values of Ctrl 3 are significantly less than Ctrl 1.

Thus, the substitution of silica in whole with low reinforcing N351 carbon black or in part by high reinforcing carbon black is considered unsuccessful.

EXAMPLE 2

This example is provided to demonstrate the effect on compound properties of using the combination of a high reinforcing carbon black, N299, and a low reinforcing carbon black, N351, to partially replace the silica in the rubber composition.

The following Table 3 lists the ingredients of both Ctrl 4 and Sample 1 (present invention). The rubber compositions were prepared in the same manner as in Example 1.

TABLE 3

| Sample No. | Ctrl 4 | Sample 1 |
|---|---|---|
| Non-Productive Mix Stages | | |
| E-SBR[1] | 25 | 25 |
| IBR[2] | 45 | 45 |
| BR[3] | 20 | 20 |
| Natural Rubber[4] | 10 | 10 |
| Processing Oil[5] | 26.3 | 26.3 |
| Zinc Oxide | 2.5 | 2.5 |
| Fatty Acid | 3 | 3 |
| Antioxidant[6] | 3 | 3 |
| Silica[7] | 80 | 30 |
| Carbon Black (N299)[8] | 0 | 20 |
| Carbon Black (N351)[9] | 0 | 30 |

TABLE 3-continued

| Sample No. | Ctrl 4 | Sample 1 |
|---|---|---|
| Coupling Agent[10] | 12.8 | 6.4 |
| Productive Mix Stage | | |
| Sulfur | 1.40 | 1.40 |
| Accelerators[11] | 3.5 | 2.6 |
| Retarder[12] | 0.1 | 0.4 |

[1]Emulsion polymerization prepared SBR having a styrene content of about 41 percent of the type obtainable as 1721 from the Huels AG company.
[2]Isoprene/butadiene copolymer rubber having an isoprene content of about 50 percent obtained from The Goodyear Tire & Rubber Company, and a Tg of about −43° C.
[3]Cis 1,4-polybutadiene rubber obtained as Budene ® 1254 from The Goodyear Tire & Rubber Company.
[4]Natural rubber (cis 1,4-polyisoprene).
[5]Rubber processing oil as being 9.4 parts in the E-SBR and 5 parts in the PBd, where the amounts of E-SBR and PBd are reported above on a dry weight (without the oil) and in addition, about 11 parts additional rubber processing oil were added.
[6]Of the alkylaryl paraphenylene diamine type.
[7]A silica obtained as Zeosil ™ 1165MP from the Rhone-Poulenc company, and reportedly, having a BET surface area of about 165 and a DBP absorption value of about 260–280.
[8]N299 has an Iodine Number of 108 g/kg and a corresponding DBP absorption value of 124 cc/100 gm.
[9]N351 has an Iodine Number of 68 g/kg and a corresponding DBP absorption value of 120 cc/100 gm.
[10]A composition of bis-(3-triethoxysilylpropyl) tetrasulfide and N333 carbon black (50/50 weight ratio and, thus, considered as being 50 percent active) commercially available as X50S from Degussa.
[11]The accelerators were of the sulfenamide and diphenylguanidine type.
[12]The retarder was of the thiophthalimide type.

The physical properties for the resulting vulcanzied rubber compositions are shown in the following Table 4.

TABLE 4

| Sample No. | Control 4 | Sample 1 |
|---|---|---|
| Stress-Strain | | |
| Tensile Strength, MPa | 16.4 | 15.0 |
| Elongation at Break, % | 460 | 330 |
| 300% Modulus | 10.8 | 14.5 |
| Rebound | | |
| 100° C., % | 61 | 60 |
| 23° C., % | 37 | 35 |
| Hardness (Shore A) | | |
| 23° C. | 65 | 67 |
| 100° C. | 62 | 62 |
| DIN Abrasion | | |
| Volume Loss (cc) | 102 | 96 |
| Tan. Delta | | |
| at 0° C. | 0.155 | 0.155 |

This example shows that the partial replacement of silica with a combination of a high reinforcing carbon black, N299, along with a low reinforcing carbon black, N351, yielded compound properties similar to the all-silica control compound. Significantly, rebound, hardness and Tan Delta (0°) values were essentially matched when 62.5 percent of the silica was replaced with the combination of the two carbon blacks. The DIN abrasion was reduced (lower is better) which would be predictive of improved treadwear.

EXAMPLE 3

Sample 2 is provided to demonstrate the effect of using both a high reinforcing carbon black, N299, in combination with a low reinforcing carbon black, N351, to partially replace the silica in the control rubber composition (Ctrl 5). Control 6 demonstrates the partial replacement using a low reinforcing carbon black alone. The ingredients for each rubber composition are listed in Table 5 below. These rubber compositions and vulcanizates were prepared using the procedures described in Example 1.

TABLE 5

| Sample No. | Ctrl 5 | Sample 2 | Ctrl 6 |
|---|---|---|---|
| Non-Productive Mix Stages | | | |
| IBR[1] | 70 | 79 | 70 |
| Natural Rubber[2] | 30 | 30 | 30 |
| Processing Oil[3] | 26.3 | 26.3 | 26.3 |
| Zinc Oxide | 2.5 | 2.5 | 2.5 |
| Fatty Acid | 3 | 3 | 3 |
| Antioxidant[4] | 3 | 3 | 3 |
| Silica[5] | 80 | 28 | 28 |
| Carbon Black (N299)[6] | 0 | 24 | 0 |
| Carbon Black (N351)[7] | 0 | 28 | 52 |
| Coupling Agent[8] | 12.8 | 4.5 | 4.5 |
| Productive Mix Stage | | | |
| Sulfur | 1.40 | 1.40 | 1.40 |
| Accelerators[9] | 3.5 | 2.6 | 2.6 |
| Retarder[10] | 0.1 | 0.4 | 0.4 |

[1] Isoprene/butadiene copolymer rubber having an isoprene content of about 50 percent obtained from The Goodyear Tire & Rubber Company, and a Tg of about −43° C.
[2] Natural rubber (cis 1,4-polyisoprene).
[3] Rubber processing oil as being 9.4 parts in the E-SBR and 5 parts in the PBd, where the amounts of E-SBR and PBd are reported above on a dry weight (without the oil) and in addition, about 11 parts additional rubber processing oil were added.
[4] Of the alkylaryl paraphenylene diamine type.
[5] A silica obtained as Zeosil ™ 1165MP from the Rhone-Poulenc company, and reportedly, having a BET surface area of about 165 and a DBP absorption value of about 260–280.
[6] N299 has an Iodine Number of 108 g/kg and a corresponding DBP absorption value of 124 cc/100 gm.
[7] N351 has an Iodine Number of 68 g/kg and a corresponding DBP absorption value of 120 cc/100 gm.
[8] A composition of bis-(3-triethoxysilylpropyl) tetrasulfide and N333 carbon black (50/50 weight ratio and, thus, considered as being 50 percent active) commercially available as X50S from Degussa.
[9] The accelerators were of the sulfenamide and diphenylguanidine type.
[10] The retarder was of the thiophthalimide type.

The physical properties for the resulting vulcanized rubber compositions are shown in the following Table 6.

TABLE 6

| Sample No. | Ctrl 5 | Sample 2 | Ctrl 6 |
|---|---|---|---|
| Stress-Strain | | | |
| Tensile Strength, MPa | 15.3 | 15.6 | 13.9 |
| Elongation at Break, % | 480 | 395 | 350 |
| 300% Modulus, MPa | 9.5 | 12.9 | 13.0 |
| Rebound | | | |
| 100° C., (%) | 60 | 59 | 61 |
| 23° C. (%) | 37 | 34 | 36 |
| Hardness (Shore A) | | | |
| 23° C. | 64 | 63 | 63 |
| 100° C. | 60 | 60 | 59 |
| DIN Abrasion | | | |
| Volume Loss (cc) | 133 | 118 | 131 |
| Tan Delta | | | |
| at 0° C. | 0.173 | 0.156 | 0.163 |

This Example shows that the replacement of 65 percent of the silica reinforcement with a combination of a high reinforcing carbon black along with a low reinforcing carbon black (Sample 2) yielded physical properties similar to the all-silica compound (Ctrls), but a lower DIN abrasion value which indicates a lower amount of rubber removed by abrasion and thus improved treadwear.

Ctrl 6 illustrates the use of a low reinforcing carbon black as a partial replacement for silica. Although the cured properties are similar to the silica Ctrl 5, the DIN abrasion is inferior to Sample 2 which represents the present invention.

What is claimed is:

1. A rubber composition which comprises (A) about 100 parts by weight of at least one diene-based elastomer selected from the group consisting of at least cis 1,4-polyisoprene rubber, 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70–95 percent trans), low vinyl polybutadiene rubber (10–30 percent vinyl), medium vinyl polybutadiene rubber (30–50 percent vinyl) and high vinyl polybutadiene rubber (50–90 percent vinyl), (B) about 50 to about 100 phr of particulate reinforcing filler consisting of silica and carbon black wherein said filler is comprised of (i) about 25 to about 50 phr of precipitated silica and (ii) about 25 to about 50 phr particulate carbon black wherein said carbon black further comprises a mixture of two carbon blacks, wherein the first carbon black has a DBP absorption value in a range of about 100 to about 140 cc/100 gm with a corresponding Iodine Number in a range of about 45 to about 70 g/kg, and the second carbon black has a DBP absorption value in a range of about 100 to about 140 cc/100 gm with a corresponding Iodine Number in a range of about 100 to about 140 g/kg; and (C) a silica coupling agent having a moiety characterized by being reactive with the surface of the silica and another moiety characterized by being interactive with elastomers having carbon-to-carbon double bonds and the weight ratio of silica coupling agent to precipitated silica ranging from 1:2 to 1:100.

2. The rubber composition of claim 1 where said silica is characterized by having a BET surface area in a range of about 50 to about 300 m$^2$/g and a dibutylphthalate (DBP) absorption value in a range of about 150 to about 300 cc/100 g.

3. The rubber composition of claim 1 wherein said silica coupler is a sulfur-containing organosilicon material.

4. The rubber composition of claim 3 wherein said sulfur-containing organosilicon compound is of the formula:

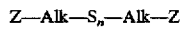

in which Z is selected from the group consisting of

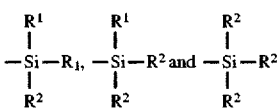

where $R^1$ is an alkyl group of 1 to 4 carbon atoms, cyclohexyl or phenyl;

$R^2$ is alkoxy of 1 to 8 carbon atoms, or cycloalkoxy of 5 to 8 carbon atoms;

Alk is a divalent hydrocarbon of 1 to 18 carbon atoms and n is an integer of 2 to 8.

5. The rubber composition of claim 1 wherein the said first carbon black is selected from at least one of N-330, N-326, N-351, N-550, N-660 and N-762 carbon blacks.

6. The rubber composition of claim 1 wherein the said second carbon black is selected from at least one of N-110, N-220, N-299 and N-347 carbon blacks.

7. The rubber composition of claim 1 which comprises (A) 100 parts by weight of at least one diene-based elastomer, (B) about 50 to about 100 phr of particulate reinforcing filler composed of silica and carbon black wherein said filler is comprised of (i) about 25 to about 50 phr of precipitated silica and (ii) about 25 to about 50 phr particulate carbon black wherein said carbon black further comprises a mixture of two carbon blacks, wherein the first carbon black has a DBP absorption value in a range of about 100 to about 140 cc/100 gm with a corresponding Iodine Number in a range of about 45 to about 70 g/kg, and the second carbon black has a DBP absorption value in a range of about 100 to about 140 cc/100 gm with a corresponding Iodine Number in a range of about 100 to about 140 g/kg; and (C) a coupling agent as a trialkoxyorganosilane polysulfide having from 2 to about 8 sulfur atoms in its polysulfide bridge.

8. The rubber composition of claim 1 wherein said rubber composition is prepared by (a) thermomechanically working and mixing a mixture comprised of the said diene-based elastomer, silica, first carbon black, second carbon black and silica coupler with at least one mechanical mixer (i) to a maximum temperature in a range of about 160° C. to about 200° C. and for a duration of time, upon reaching said maximum temperature, in a range of about 1 to about 10 minutes at a temperature within about 5° C. to about 10° C. of said maximum temperature or (ii) to a maximum temperature in a range of about 155° C. to about 180° C. and for a duration of time, upon reaching said maximum temperature, in a range of about four to about 20 minutes at a temperature within about 5° C. to about 10° C. of said maximum temperature, followed by (b) mixing curatives with said mixture in a final mixing stage for about 1 to about 4 minutes to a temperature of about 90° C. to about 120° C.; whereas the rubber mixture is cooled to a temperature below about 40° C. between each of the aforesaid mix stages.

9. A tire having a tread of the rubber composition of claim 1.

10. A tire having a tread of the rubber composition of claim 8.

11. The rubber composition of claim 1 wherein said first carbon black is N-351 carbon black and wherein said second carbon black is N-299 carbon black.

12. The rubber composition of claim 1 wherein said 100 parts by weight of at least one diene-based elastomer comprises 10 to 30 phr of natural rubber and 45 to 70 phr of isoprene/butadiene copolymer rubber.

* * * * *